US008666686B2

(12) United States Patent
Di Iorio

(10) Patent No.: US 8,666,686 B2
(45) Date of Patent: Mar. 4, 2014

(54) METHOD AND APPARATUS FOR DETECTING POSSIBLE CORRELATIONS BETWEEN SIGNAL PATTERNS

(75) Inventor: Paolo Di Iorio, San Nicole la Strada (IT)

(73) Assignee: STMicroelectronics International N.V., Geneva (CH)

( * ) Notice: Subject to any disclaimer, the term of this patent is extended or adjusted under 35 U.S.C. 154(b) by 742 days.

(21) Appl. No.: 12/530,969

(22) PCT Filed: Mar. 12, 2007
(Under 37 CFR 1.47)

(86) PCT No.: PCT/EP2007/002141
§ 371 (c)(1),
(2), (4) Date: Apr. 19, 2010

(87) PCT Pub. No.: WO2008/110183
PCT Pub. Date: Sep. 18, 2008

(65) Prior Publication Data
US 2010/0324842 A1 Dec. 23, 2010

(51) Int. Cl.
*G01R 21/00* (2006.01)

(52) U.S. Cl.
USPC ............ 702/60; 375/147; 375/148; 375/150; 375/355

(58) Field of Classification Search
USPC ............... 702/60; 375/147, 148, 150, 355
See application file for complete search history.

(56) References Cited

U.S. PATENT DOCUMENTS

| 5,757,850 | A * | 5/1998 | Takaki | 375/225 |
|---|---|---|---|---|
| 6,466,929 | B1 * | 10/2002 | Brown et al. | 706/48 |
| 6,848,619 | B1 * | 2/2005 | Leydier | 235/492 |
| 7,039,091 | B1 * | 5/2006 | Mauer | 375/140 |
| 2002/0051487 | A1 * | 5/2002 | Yamada et al. | 375/232 |
| 2004/0088124 | A1 * | 5/2004 | Schendel et al. | 702/60 |
| 2005/0152541 | A1 * | 7/2005 | Takenaka et al. | 380/28 |
| 2006/0161611 | A1 * | 7/2006 | Wagner et al. | 708/422 |
| 2006/0200514 | A1 * | 9/2006 | Fischer et al. | 708/446 |
| 2007/0091987 | A1 * | 4/2007 | Cho | 375/148 |

OTHER PUBLICATIONS

Paul Kocher, Joshua Jaffe, and Benjamin Jun, "Introduction to Differential Power Analysis and Related Attacks", Copyright 1998 by Cryptography Research, and Cryptograph Research, Inc.* de Lamare et al., Strategies to Improve the Performance of Very Low Bit Rate Speech Coders and Application to a Variable Rate 1.2 kb/s Codec, IEEE Proceedings: Vision, Image and Signal Processing, Institution of Electrical Engineers, vol. 152, No. 1, Feb. 28, 2005.

Clavier et al., Differential Power Analysis in the Presence of Hardware Countermeasures, Cryptographic Hardware and Embedded Systems, Second International Workshop Proceedings, Aug. 17-18, 2000.

(Continued)

*Primary Examiner* — Marc Armand
*Assistant Examiner* — Haidong Zhang
(74) *Attorney, Agent, or Firm* — Allen, Dyer, Doppelt, Milbrath & Gilchrist, P.A.

(57) ABSTRACT

A method for detecting possible correlations between signal patterns of a power signal used by an electronic device during execution of operations, including setting couples of windows including respective pairs of sequences of the sampling values. The method includes computing values of correlations between the respective pairs of sequences. Each values may be determined by computing a maximum value of correlation between one sequence of a couple and a plurality of sequences of sampled values included in corresponding moving windows.

13 Claims, 2 Drawing Sheets

(56) References Cited

OTHER PUBLICATIONS

Messerges et al., Power Analysis Attacks of Modular Exponentiation in Smartcards, Cryptographic Hardware and Embedded Systems, International Workshop, Aug. 1999.

Kocher et al., Differential Power Analysis, Lecture Notes in Computer Science, Crypto'99, vol. 1666, 1999.

Brier et al., Correlation Power Analysis with a Leakage Model, Cryptographic Hardware and Embedded Systems, CHES 2004, Lecture Notes in Computer Science, vol. 3156, 2004.

* cited by examiner

METHOD AND APPARATUS FOR DETECTING POSSIBLE CORRELATIONS BETWEEN SIGNAL PATTERNS

FIELD OF THE INVENTION

The present invention relates to a method and to an apparatus for detecting possible correlations between signal patterns of a power signal used by an electronic device during execution of operations, including a phase of sampling a plurality of values of the power signal, at corresponding sampling time, a phase of setting pairs of windows including respective pairs of sequences of the sampling values and computing values of correlations between the pairs of sequences.

BACKGROUND OF THE INVENTION

As it is well known, an analysis of a power consumption on an electronic device may be indicative of the operations executed by the electronic device. In particular, detecting devices and methods for detecting the power consumption of the electronic device provide monitoring a power signal consumed by such electronic device, hereinafter indicated as a power signal.

Values of the power signal are sampled at sampling time intervals and stored in a memory of the detecting apparatus in order to detect a correlation between sampled values and/or a correlation between sequences of such sampled values. In fact, a sequence of sampled values, also referred to as a signal pattern, repeated in a substantially same manner at different time intervals, may be indicative of a same operation performed in the corresponding time intervals.

More particularly, the detecting apparatus and methods mentioned above execute analysis on a plurality of signal patterns, stored in connection to corresponding time intervals, in order to identify correlations between two or more different signal patterns and to retrieve information about the corresponding operations, executed by the electronic device. For example, the detecting apparatus and methods for detecting power consumption may be used for establishing the security of an IC Card secure algorithm, i.e. a cryptographic algorithm. In this case, the analysis of the signal patterns is used to scan a vulnerability of the cryptographic algorithm: the higher the correlations between signal patterns are, the higher the possibility to retrieve secure data, for example, a cryptographic key stored inside the IC Card. In other words, since the detection of repetition of signal patterns could be used to get information about the implementation of a cryptographic algorithm, or to try to extract or identify data in the IC Card, the detecting apparatus and methods generally must be used to test the vulnerability of the IC Card and to ensure its security, before its releasing.

A known method to detect repetitive patterns is based on a computation of a correlation function between sampled values of power signals: the correlation substantially results in a number indicative of a degree of relationship between such sampled values, and, consequently, a relationship between the operations performed by the electronic device. More particularly, a correlation matrix is used to store correlations between sampled values, for example, deriving by the sampling of a power signal S through a low pass filter, having a bandwidth determined empirically.

With reference to FIG. 1 a diagram 10 schematically shows sampled values of a power at corresponding sampling time intervals. A window Bs is defined to detect correlations between sampled values in a corresponding time interval T0-T2, and a step (Step) is defined for advancing the window Bs, in order to detect correlations between sampled values in an advanced time interval T1-T3. The length of the step Step is less than the length of the window Bs so that when the window Bs is advanced, the correlation function may include some sampled values belonging to the corresponding time intervals T0-T1, whereon the window Bs was previously set.

A sequence of sampled values $S_i$, including a plurality of sampled values may for example be processed according to the formula:

$$s_i = S(t) \ \forall t \in [i \cdot Bs, (i+1) \cdot Bs]$$

The correlation matrix, hereafter C, may be calculated as $$C(i,j) = |r(s_i, s_j)|,$$

where r is the correlation coefficient between the sequences $S_i$ and $S_j$, indicative of the degree of similarity between such sequences of sampled values.

The detecting apparatus and method may process the correlation matrix C for a plurality of sample values and display a result of the computation on a two dimensional image, for example, on a monitor connected to the detecting device, representing the repetition of signal patterns.

As it is apparent from FIG. 2, the image representing the correlation matrix C, even if it is one of the best graphical results achievable through a known detecting apparatus and method, does not provide a clear representation of the correlation matrix. More particularly, the correlation matrix C in FIG. 2 includes a sub-matrix, wherein high correlation between signal patterns is represented with a substantially grey square. As it is apparent, in the matrix of FIG. 2, the grey square representing a correlation of two signal patterns is not clear, even when such patterns are strictly correlated, so it is really difficult to analyze the graphical representation of the correlation matrix C to determine different degrees of correlations.

According to the known method for detecting correlations, the graphical appearance of the correlation matrix C substantially depends on the length of the window Bs and on the step Step used to process correlation matrix C. In order to obtain a good graphical representation of the correlation matrix C, several empirical executions should be processed. Moreover, even for a length of the window Bs and for a step Step conveniently set, the graphical resolution may depend by the number of greys used to plot it.

Another known drawback is that in a correlation matrix calculated with a short step Step, in order to determine correlations with high precision, a very large size matrix and a lot of memory for storing the correlations are generally required. Moreover long post-processing time may be required if further elaboration is needed.

The technical problem is that of providing a method for detecting possible correlations between signal patterns corresponding to the power consumption of an electronic device, able to reduce the time and steps needed to process a correlation matrix, reduce memory size consumption, and at the same time determine, with high precision, the correlations, providing a deeper and a faster test for the security of the electronic device, and overcoming the limits that currently affect the detecting method for signal patterns.

SUMMARY OF THE INVENTION

The approach on which the present embodiments are based, is that of providing a method for detecting correlations between signal patterns of a power signal of the type described above, wherein, for each sequence $S_t$ of sampled values representing a signal pattern in a window $W_i$ of the power signal, a maximum value of correlation is processed. Such maximum value is determined with respect to a plurality of sequences $S_i^k$ of sampled values that represents signal patterns in windows $W_i^k$ selected near the window $W_i$ and having the same size. The window $W_i$ is reset, substantially advanced of the size of the window itself, in order to process the maximum value for a plurality of sequences $S_i$, representing corresponding signal patterns. Only the maximum values so determined are stored in a correlation matrix, not requiring large memory size and determined without empirical selection of a specific Step for advancing the window $S_i$.

This problem is addressed, according to the present embodiments, by a method for detecting correlations between signal patterns of a power signal of the type consumed by an electronic device during execution of operations, including sampling a plurality of values of the power signal at corresponding sampling times. The method includes setting pairs of windows including respective pairs of sequences of the sampling values, and computing values of correlations between the respective sequences. Each of the values is determined by computing a maximum value of correlation between one sequence of the pairs and a plurality, of sequences of sampled values included in corresponding moving windows.

Further characteristics and the advantages of the method will be apparent from the following description of an embodiment thereof, made with reference to the annexed drawings, given for indicative and non-limiting purpose.

DETAILED DESCRIPTION OF THE PREFERRED EMBODIMENTS

With reference to the annexed drawings, a method for detecting correlations between signal patterns of a power signal S is hereafter described. More particularly, the power signal S is used or consumed by an electronic device during execution of operations.

The electronic device is, for example, an IC Card storing a plurality of data in a memory portion and intended to be connected to a read-write device to be updated or read. The IC Card includes security means, for example, a secure key and a cryptographic algorithm, in order to execute a security operation for protecting sensible data stored inside its memory portion. During execution of operations, the IC Card consumes the power signal S, depending on a computational requirement of such operations.

Figure 1:
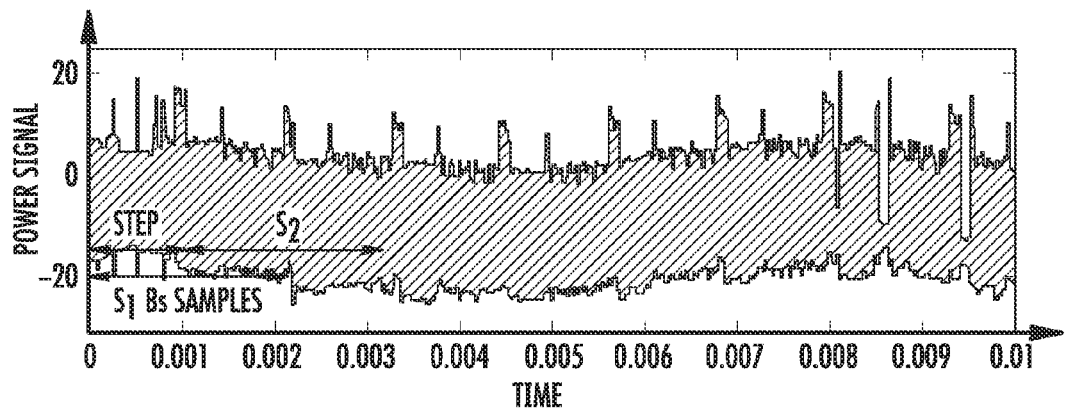
FIG. 1 represents in a diagram, values of a power signal consumed by an electronic device, the values being sampled by a method according to the prior art.
Figure 2:
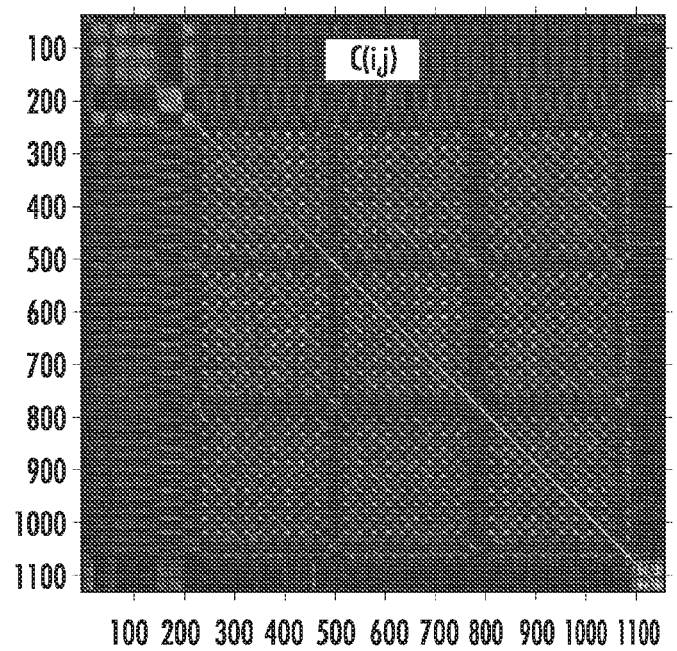
FIG. 2 is a plot of a correlation matrix processed on the sampled values of FIG. 1 by a method according to the prior art.
Figure 3:
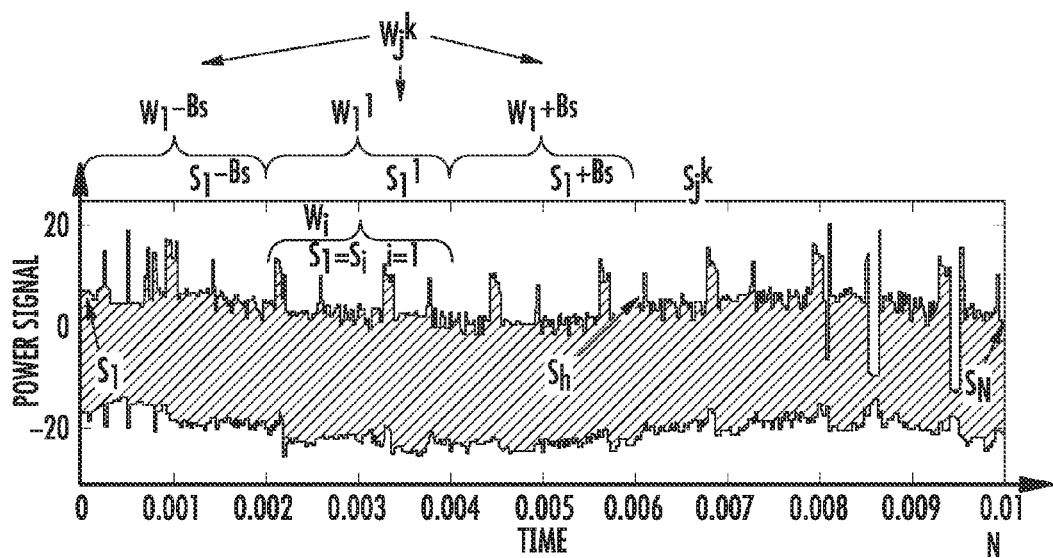
FIG. 3 represents in a diagram, the values of a power signal consumed by an electronic device, sampled by a method according to the present invention.

According to the method of the present invention, a sampling of a plurality of values $s_1$, $s_N$ of the power signal S is executed as follows:

$$S(t_h) = s_h,$$

where $s_h$ is the value of S at time $t_h$, $1 <= h <= N$; in FIG. 3, a value of N is 0.01. A sequence $S_i$ of sampled values $s_h$ represents a signal pattern of the power signal S. The sequence $S_i$ includes a plurality of sampled values $s_h$, for example, filtered through a low pass filter, known in the art.

A plurality of sequences $S_i$, $S_j$ of sampled values $s_h$ is stored in a memory portion of a detecting device, for example, a personal computer connected to the read-write device, in order to process correlations between every couple of the sequences $S_i$, $S_j$. The correlations between pairs of sequences $S_i$, $S_j$ of sampled values $s_h$ is stored in a correlation matrix $C(i,j)$.

A value of the correlation matrix $C(i,j)$, for specified values of i and j, is determined by processing a maximum value of correlations between the sequence $S_i$, and a plurality of sequences $S_j^k$ varying the parameter k.

More particularly, for each i and j, the power signal S is sampled based upon a couple of windows $W_i$, $W_j$ including respective sequence $S_i$, $S_j$ of Bs sampled values $s_h$. The windows $W_i$, $W_j$ of Bs sampled values are reset or moved to execute analysis on the repetitions of signal patterns associated to different portions of the power signal S. For example, an advanced window $W_{j+1}$ may include sampled values $s_h$ already included in a previous sequence $S_j$, or it may include sampled values not previously considered.

Given a value of i and j for a corresponding couple of sequences $S_i$ and $S_j$ of sampled values, a plurality of correlations r are processed for determining a corresponding value of the correlation matrix $C(i,j)$.

More particularly, given a couple of sequences $S_i$, $S_j$ of sampled values $s_h$ the correlation value is processed as follows:

$$C(i, j) = \text{Max}_k\{|r(s_i, s_j^k)|\}, \quad (1)$$

where $$s_j^k = S(t) \quad \forall\, t \in [j \cdot Bs + k, (j+1) \cdot Bs + k] \quad k \in [-Bs, Bs] \quad (2)$$

$$\begin{cases} s_j^k = S(t) & \forall\, t \in [j \cdot Bs + k, (j+1) \cdot Bs + k] \quad k \in [-Bs, Bs] \quad (3) \\ s_0^k = S(t) & \forall\, t \in [j \cdot Bs + k, (j+1) \cdot Bs + k] \quad k \in [0, Bs] \quad (4) \\ s_N^k = S(t) & \forall\, t \in [j \cdot Bs + k, (j+1) \cdot Bs + k] \quad k \in [-Bs, 0] \quad (5) \end{cases}$$

$$S_i = S(t) \quad \forall\, t \in [i \cdot Bs, (i+1) \cdot Bs] \quad (6)$$

In other words, a correlation value $(\text{Max}(|r(S_i, S_j^k)|))$ for the correlation matrix $C(i,j)$ is not calculated based upon a couple of sequences $S_i$, $S_j$ of sample values $s_h$ belonging to respective windows $W_i$, $W_j$ of Bs samples, but on a plurality of pairs of sequences obtained by coupling a sequence $S_i$ and a plurality of sequences $S_j^k$ of sampled values $s_h$.

In order to better understand the method, an example of sequences of sampled values are given for some values of i and j. With reference to formula (2), a plurality k of sequences $S_i$ are sampled for each value of j. For example, for j=1, $$S_1^k = S(t) \text{ with } t \in [B_s + k, 2B_s + k] \text{ and } k \in [-Bs, Bs]$$

According to the formula here above, when k is equal to its minimum value $-Bs$, $$S_1^{-Bs} = S(t) \text{ with } t \in [0, B_s] \text{ while,}$$

when k is equal to its maximum value $+Bs$, $$S_1^{+Bs} = S(t) \text{ with } t \in [2B_s, 3B_s]$$

Similarly, for j=2, $$S_2^k = S(t) \text{ with } t \in [2B_s + k, 3B_s + k] \text{ and } k \in [-Bs, Bs]$$

More particularly, when k is equal to its minimum value −Bs, $$S_2^{-Bs} = S(t) \text{ with } t \in [B_s, 2B_s];$$

when k is equal to its maximum value +Bs, $$S_2^{+Bs} = S(t) \text{ with } t \in [3B_s, 4B_s]$$

With reference to formula (6), sequences $S_i$ are sampled for each value of i, for example $$S_1 = S(t) \text{ with } t \in [B_s, 2B_s];$$

$$S_2 = S(t) \text{ with } t \in [2B_s, 3B_s]$$

With reference to FIG. 3 the sequences $S_1^{-Bs}$, $S_1^{+Bs}$, $S_1^1$ and $S_1$ are schematically represented. The sequences $S_1^{-Bs}$, $S_1^{+Bs}$, $S_1^1$, as well as other sequences $S_1^k$ not indicated in FIG. 3, are used to process corresponding values of a correlation with the sequence S1.

The maximum value of such correlations, $\text{Max}(|r(S_i, S_j^k)|)$, is stored in the correlation matrix $C(i,j)$. Such a computation is repeated for different values of i and j, varying the parameter k, for all the values of the correlation matrix $C(i,j)$. More particularly, a cell of the correlation matrix C reports the maximum values of all the correlation values processed on the pairs of sampled values $S_i$, $S_j^k$, varying the parameter K.

As described by the formulas above, the method sets a range for the selection of the parameter K, such range being determined in order to include sampled values not only belonging to the window $W_j$ of Bs samples, but also belonging to a plurality of windows $W_j^k$. Moreover, not only are the sampled values belonging to the window $W_j$ used for determining a maximum value of correlation, but also sampled values belonging to a window $W_{j-1}$, set by a previous execution of the phase for setting. The window $W_j$, when the processing of the correlations inside it is finished, is advanced of a step equal to the size of the windows $W_j$.

Advantageously, several empirical executions of the method are generally not required to optimize the determination of the correlation matrix, nor the rendering of its graphical representation. In fact, a step for advancing the window $W_j$ may be equal to the window size $W_j$ itself. The parameter K includes the processing of sampled values included in a plurality of windows $W_j^k$.

A formula (4) is used to determine the sequences $S_j^k$ of sampled values when j=0, corresponding to a first sequences of sampled values. In fact, since no sampled values are available before the sampling time 0, in this case the parameter k is set to be included in the closed interval [0, Bs], in order to relate to sampled values in a windows $W_0$.

Similarly, the method defines a formula (5) to determine the sample values $S_j$ when j=N, corresponding to the last sampled value. In fact, since no sampled values are available after the sampling value N, the parameter k is set to be included in the closed interval [−Bs, 0], so that k may relate to sampled values included in the windows prior to the current windows. The setting of windows and the correlations are iterated, as well as the phase of processing a maximum value of the correlations, so that the power signal S is scanned and the corresponding signal patterns may be compared.

Figure 4:
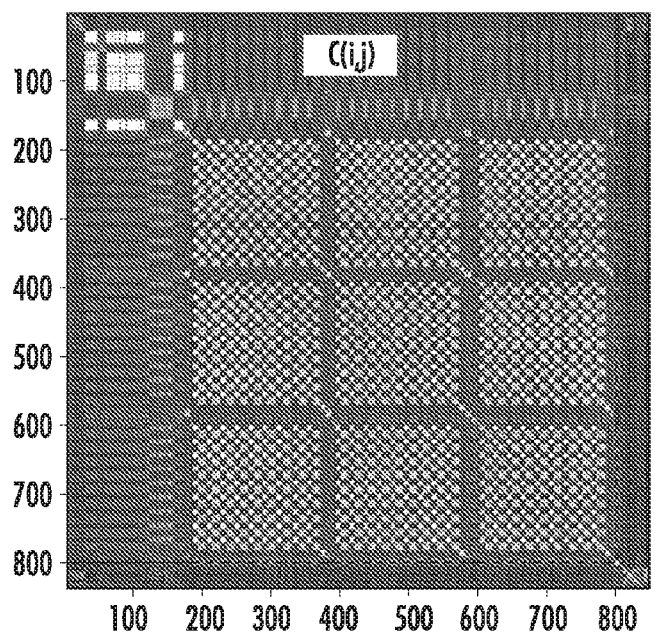
FIG. 4 is a plot of a correlation matrix processed on sampled values according to the detecting method of the present invention.

FIG. 4 schematically represents a graphical representation of the correlation matrix $C(i,j)$ determined by a computation according to the method. Such graphical representation is a grey map, rendering easier with respect to the prior art, the detection of repetition of signal patterns. Advantageously, not only does the correlation matrix $C(i,j)$ store maximum values of correlations, but also the graphical representation of the correlation matrix allows deeper and faster analysis, the gray scale map rendering signal pattern repetitions more distinguishable. Advantageously, the method for detecting the correlations between signal patterns represents such correlations in a well rendered graphical reproduction, reducing the time needed to determine the correlations and enforcing their evidence, distinctly indicating a high level of correlation and a low level of correlation.

The analysis of repetitive pattern through the method may result in a deeper and faster test for the security of the electronic device and overcomes the limits related to the prior art method.

The present embodiments also relate to an apparatus for detecting correlations between signal patterns of the type consumed by an electronic device during execution of operation. The apparatus includes an electronic reader for the electronic device.

Without limiting the scope of protection, the electronic device is, for example, an IC card, and the electronic reader is an IC Card reader of the type including a slot for receiving the IC Card and a plurality of contact pads for coupling with corresponding contact pads on the IC Card. The IC Card reader is connected, via a standard communication channel, to a central processing device, intended to send instructions to the IC Card. The instructions sent from the central processing device to the IC Card reader are of the type requiring an execution of sensible information on the IC Card. Upon receipt of an instruction, the IC Card executes a plurality of operations, processes a result, and returns it to the central processing device.

According to the apparatus, a sampling device is connected between the IC card reader and the central processing device, substantially along the standard communication channel, in order to detect a power signal consumed by the IC Card during execution of operations. The sampling device is, for example, an oscilloscope. More particularly, the power consumed by the IC Card is sampled during a plurality of time intervals. A plurality of values sampled is forwarded to the central processing device. Such central processing device stores the sampled values in an internal memory and executes a detection of a correlation between the sampled values. More particularly, the sequences $S_i$, $S_j^k$ of sampled values $s_h$ are stored in a memory of the central processing device in order to be compared for detecting a correlation between pairs $S_i$, $S_j$ of sequences of sampled values $s_h$.

Sequences $S_i$, $S_j$ of such sampled values $s_h$, repeated in a substantially same manner at different time intervals, are displayed through a graphical representation, plotted on a display connected in a conventional way to the central processing device. More particularly, the memory of the central processing device stores sequences $S_i$, $S_j$ of the sampling values $s_h$ substantially representing a portion or a signal pattern of the power signal consumed by the IC Card.

Moreover, the memory of the central processing device also stores a plurality of subset of sampling values $s_i$, $s_j$, representing different portions of the power signal. The memory portion of the central processing device also stores a correlation matrix representing all the correlations between pairs of sampled values $s_i$, $s_j$. Each value stored in the correlation matrix inside the memory portion is a correlation value representing the maximum values of all the correlation values of sampled values $s_i$, $s_j^k$.

Advantageously, the memory portion stores maximum values of correlations and the graphical representation displayed may allow deeper and faster analysis. The graphical representation is a grey scale map rendering signal pattern repetitions easy and distinguishable.

Advantageously, the apparatus for detecting correlations between signal patterns stores correlations that may be displayed in a well rendered graphical reproduction, reducing the time needed to determine the correlations, and enforcing their evidence distinctly indicating a high level of correlation and a low level of correlation.

That which is claimed:

1. A method for detecting correlations between signal patterns of a power signal used by an electronic device during execution of operations, the method comprising:

using a processor for
sampling a plurality of values of the power signal at corresponding sampling times,
setting pairs of windows including respective pairs of sequences of the plurality of sampling values, and
computing values of correlations between the respective pairs of sequences, each of the values of correlations being determined by computing a value of correlation between one sequence of the respective pairs of sequences and a plurality of sequences of sampled values included in corresponding moving windows,
the moving windows being moved according to the formula:

$$s_j^k = S(t) \ \forall t \in [j \cdot Bs + k, (j+1) \cdot Bs + k] \ k \in [-Bs, Bs],$$

wherein Bs represents the size of the moving window, $S(t)$ is a power signal with respect to time, s is a sample value, and j is an index value.

2. The method according to claim 1 wherein the values of correlations each comprises a maximum value of correlations.

3. The method according to claim 1 wherein a size of each moving window is set equal to a size of one of the pairs of windows.

4. The method according to claim 1 wherein the value of correlation is stored in a correlation matrix.

5. The method according to claim 1 wherein the respective pairs of sequences are sampled according to the formula:

$$s_i = S(t) \ \forall t \in [i \cdot Bs, (i+1) \cdot Bs],$$

wherein Bs represents the size of the moving window, $S(t)$ is a power signal with respect to time, s is a sample value, and i is an index value.

6. A method for detecting correlations between signal patterns of a power signal used by an electronic device, the method comprising:

using a processor for
sampling a plurality of values of the power signal,
setting pairs of windows including respective pairs of sequences of the plurality of sampling values, and
computing a value of correlation between one sequence of the respective pairs of sequences and a plurality of sequences of sampled values included in corresponding moving windows,
the moving windows being moved according to the formula:

$$s_j^k = S(t) \ \forall t \in [j \cdot Bs + k, (j+1) \cdot Bs + k] \ k \in [-Bs, Bs],$$

wherein Bs represents the size of the moving window, $S(t)$ is a power signal with respect to time, s is a sample value, and j is an index value.

7. The method according to claim 6 wherein the value of correlation comprises a maximum value of correlation.

8. The method according to claim 6 wherein a size of each moving window is based upon a size of one of the pairs of windows.

9. The method according to claim 6 wherein the respective pairs of sequences are sampled according to the formula:

$$s_i = S(t) \ \forall t \in [i \cdot Bs, (i+1) \cdot Bs],$$

wherein Bs represents the size of the moving window, $S(t)$ is a power signal with respect to time, s is a sample value, and i is an index value.

10. An apparatus for detecting correlations between signal patterns of a power signal, the apparatus comprising:

a sampling device configured to sample a plurality of values of the power signal; and
a processing device configured to set pairs of windows including respective pairs of sequences of the plurality of sampling values;
said processing device also configured to compute a value of correlation between one sequence of the respective pairs of sequences and a plurality of sequences of sampled values included in corresponding moving windows;
the moving windows being moved according to the formula:

$$s_j^k = S(t) \ \forall t \in [j \cdot Bs + k, (j+1) \cdot Bs + k] \ k \in [-Bs, Bs],$$

wherein Bs represents the size of the moving window, $S(t)$ is a power signal with respect to time, s is a sample value, and j is an index value.

11. The apparatus according to claim 10 wherein the value of correlation comprises a maximum value of correlation.

12. The apparatus according to claim 10 wherein a size of each moving window is based upon a size of one of the pairs of windows.

13. The method according to claim 10 wherein the respective pairs of sequences are sampled according to the formula:

$$s_i = S(t) \ \forall t \in [i \cdot Bs, (i+1) \cdot Bs],$$

wherein Bs represents the size of the moving window, $S(t)$ is a power signal with respect to time, s is a sample value, and i is an index value.

* * * * *